(12) United States Patent
Yokoyama et al.

(10) Patent No.: US 10,466,027 B2
(45) Date of Patent: Nov. 5, 2019

(54) SYSTEM AND METHOD FOR MARKER PLACEMENT

(71) Applicant: FUJITSU TEN CORP. OF AMERICA, Torrance, CA (US)

(72) Inventors: Masato Yokoyama, Carson, CA (US); Hiroshi Iwabuchi, Torrance, CA (US)

(73) Assignee: FUJITSU TEN CORP. OF AMERICA, Torrance, CA (US)

( * ) Notice: Subject to any disclaimer, the term of this patent is extended or adjusted under 35 U.S.C. 154(b) by 203 days.

(21) Appl. No.: 15/629,271

(22) Filed: Jun. 21, 2017

(65) Prior Publication Data

US 2018/0372467 A1    Dec. 27, 2018

(51) Int. Cl.
| | |
|---|---|
| *G01B 3/04* | (2006.01) |
| *H04N 17/00* | (2006.01) |
| *G01B 11/27* | (2006.01) |
| *G06T 7/80* | (2017.01) |
| *H04N 7/18* | (2006.01) |

(52) U.S. Cl.
CPC ............. *G01B 3/04* (2013.01); *G01B 11/272* (2013.01); *G06T 7/80* (2017.01); *H04N 17/002* (2013.01); *B60Y 2304/09* (2013.01); *H04N 7/181* (2013.01)

(58) Field of Classification Search
CPC .......... G01B 3/04; G01B 11/272; B60R 1/002
USPC ................. 33/578, 478, 608, 286; 248/148; 348/148
See application file for complete search history.

(56) References Cited

U.S. PATENT DOCUMENTS

| | | | | |
|---|---|---|---|---|
| 1,919,551 | A | * | 7/1933 | Claude ...................... B25H 7/00 33/478 |
| 4,165,567 | A | * | 8/1979 | Olsson ...................... G01B 5/25 33/288 |
| 4,319,402 | A | * | 3/1982 | Martin .................... G01B 5/207 33/392 |
| 4,357,755 | A | * | 11/1982 | Allen .................... E04G 21/185 33/1 H |
| 4,899,457 | A | * | 2/1990 | Fergus ................... G01B 5/207 33/286 |

(Continued)

FOREIGN PATENT DOCUMENTS

| | | |
|---|---|---|
| CN | 103091667 B | 12/2014 |
| CN | 103162622 B | 6/2016 |

(Continued)

OTHER PUBLICATIONS

Kolahi, A. et al., "Design of a marker-based human motion tracking system," ScienceDirect, Biomedical Signal Processing and Control, vol. 2, 2007, pp. 59-67.

(Continued)

*Primary Examiner* — Christopher W Fulton
(74) *Attorney, Agent, or Firm* — Miller, Matthias & Hull LLP (57) ABSTRACT

A system for marker placement includes a plurality of puzzle blocks connectable by a connection mechanism. The plurality of puzzle blocks include a plurality of markers positioned in a predetermined configuration. The puzzle blocks are connected together by the connection mechanism to surround a sensor for calibration of the sensor with the plurality of markers. The puzzle blocks include one or more sizes and have a quantity based on a calibration parameter of the sensor.

22 Claims, 11 Drawing Sheets

(56) References Cited

U.S. PATENT DOCUMENTS

| | | | |
|---|---|---|---|
| 4,922,623 A * | 5/1990 | Aldrich | G01B 5/207 |
| | | | 33/203.2 |
| 4,934,063 A * | 6/1990 | Speisser | G01B 5/207 |
| | | | 33/288 |
| 5,515,613 A * | 5/1996 | Hinson | G01B 5/0025 |
| | | | 33/288 |
| 6,813,371 B2 | 11/2004 | Kakinami | |
| 6,964,111 B1 * | 11/2005 | Duffield | B25H 7/00 |
| | | | 33/456 |
| 7,770,301 B1 * | 8/2010 | Grandberry | G01B 3/004 |
| | | | 33/494 |
| 8,212,878 B2 | 7/2012 | Shima et al. | |
| 9,183,746 B2 | 11/2015 | Wu et al. | |
| 9,261,428 B2 | 2/2016 | Hoffmann | |
| 9,275,458 B2 | 3/2016 | Oh et al. | |
| 9,319,667 B2 | 4/2016 | Lin et al. | |
| 9,342,888 B2 | 5/2016 | Menashe et al. | |
| 9,443,309 B2 | 9/2016 | Menashe et al. | |
| 9,491,451 B2 | 11/2016 | Pliefke | |
| 9,563,951 B2 | 2/2017 | Okouneva | |
| 2001/0006554 A1 | 7/2001 | Kakinami | |
| 2008/0007619 A1 | 1/2008 | Shima et al. | |
| 2010/0082281 A1 * | 4/2010 | Nakamura | G06T 7/80 |
| | | | 702/95 |
| 2010/0154236 A1 * | 6/2010 | Hall | E04F 13/0862 |
| | | | 33/645 |
| 2012/0287232 A1 | 11/2012 | Natroshvili et al. | |
| 2014/0139671 A1 | 5/2014 | Oh et al. | |
| 2014/0184814 A1 | 7/2014 | Lin et al. | |
| 2014/0217888 A1 | 8/2014 | Hoffmann | |
| 2014/0232871 A1 | 8/2014 | Kriel et al. | |
| 2014/0267733 A1 | 9/2014 | Wu et al. | |
| 2014/0320658 A1 | 10/2014 | Pliefke | |
| 2014/0347486 A1 | 11/2014 | Okouneva | |
| 2015/0208041 A1 | 7/2015 | Wang et al. | |
| 2015/0228077 A1 | 8/2015 | Menashe et al. | |
| 2015/0253161 A1 | 9/2015 | Ham et al. | |
| 2015/0254853 A1 | 9/2015 | Tanaka et al. | |
| 2015/0329048 A1 | 11/2015 | Wang et al. | |
| 2015/0332098 A1 | 11/2015 | Wang et al. | |
| 2015/0332446 A1 | 11/2015 | Wang et al. | |
| 2015/0356735 A1 | 12/2015 | Shimizu et al. | |
| 2016/0176343 A1 | 6/2016 | Sakano et al. | |
| 2016/0203373 A1 | 7/2016 | Menashe et al. | |
| 2016/0300113 A1 | 10/2016 | Molin et al. | |
| 2016/0343136 A1 | 11/2016 | Heidi et al. | |
| 2017/0032526 A1 | 2/2017 | Gao et al. | |
| 2017/0032537 A1 * | 2/2017 | Li | H04N 17/002 |
| 2017/0054974 A1 | 2/2017 | Pliefke | |

FOREIGN PATENT DOCUMENTS

| | | |
|---|---|---|
| DE | 102013201137 A1 | 8/2013 |
| DE | 102016006615 A1 | 11/2016 |
| KR | 10-2017-0022609 A | 3/2017 |
| WO | 2013/154085 A1 | 10/2013 |
| WO | 2017/016541 A1 | 2/2017 |

OTHER PUBLICATIONS

OptiTrack, "Calibration Tools," 2017, NaturalPoint, Inc., [retrieved on Apr. 26, 2017], Retrieved from the Internet <URL: https://optitrack.com/products/tools/>, 2017, 6 pages.

Hella Gutmann Solutions, "CSC Kit Camera," [retrieved on Apr. 26, 2017], Retrieved from the Internet <URL:http//hella-gutmann.co.uk/wp-content/uploads/2016/03/HGS-CSC-Kit-Camera-Product-Sheet.pdf>, Mar. 2016, 2 pages.

Hella Gutmann Solutions, "CSC-Tool," [retrieved on Apr. 26, 2017], Retrieved from the Internet <URL:http://hella-gutmann.co.uk/wp-content/uploads/2015/04/433-HGS-CSC-Tool-Product-Sheet.pdf>, Apr. 2015, 2 pages.

* cited by examiner

| MODEL | CONFIGURATION OF ADJUSTABLE FRONT AND REAR SPACES | LATERAL LEG CROSS MARKER POSITION | CONFIGURATION OF ADJUSTABLE LATERAL SPACES | POSITIONS FOR MOVEABLE SLIDE MARKER |
|---|---|---|---|---|
| RAV4 | 100 | 5 | 0 | 14.27 |
| LX | 100 | 8 | 0 | 13.25 |
| Camry | 0 | 3 | 200 | 14.29 |
| RX | 200 | 5 | 300 | 15.32 |
| Land Cruiser | 100 | 6 | 400 (200+200) | 15.27 |
| Highlander | 300 (200+100) | 2 | 500 (200+300) | 16.31 |
| LS | 200 | 8 | 700 (300+200+200) | 14.34 |

FIG. 9

SYSTEM AND METHOD FOR MARKER PLACEMENT

FIELD

Embodiments of the present invention relate to a system and method for marker placement.

BACKGROUND

An on-vehicle camera or sensor system, such as the camera sensor system described in US Patent Application Publication No. 20150356735 which displays a birds-eye view around a vehicle, requires that multiple sensor markers be placed at specifically measured locations around a vehicle during a camera calibration process. Currently, automobile makers and dealers use a published measurement specification to devise the requisite markers, measure specified locations around a vehicle, and place the devised markers in the specified locations around the vehicle for camera or sensor calibration. Devising the requisite markers, measuring a distance around a vehicle, and placing markers in the specified locations around the vehicle for a system calibration can be a time-consuming and laborious process. Further, this calibration process can be cost prohibitive. For example, it is known for an on-vehicle camera system calibration process to take a few hours and require multiple technicians to complete, which is very inefficient.

SUMMARY

At least one embodiment of the present invention provides a system for marker placement including a plurality of puzzle blocks or pieces connectable by a connection mechanism. The plurality of puzzle blocks include a plurality of markers that may be positioned in a predetermined configuration, with a predetermined distance, surrounding a sensor system to be calibrated. The puzzle blocks may be connected together by the connection mechanism to surround the sensor system, whereupon a plurality of markers may be placed for sensor calibration. This will allow the markers to be set up quickly without the need for specific measurement and placement of each and every marker around the sensor system.

At least another embodiment of the present invention provides a method for marker placement that includes designating perimeter lines encompassing or surrounding the sensor system to be calibrated. When the sensor system is mounted on a vehicle, such as the camera sensor system noted earlier, the perimeter lines may include a side line, e.g., a string, secured to each of a left rear and a right rear cross section of a rear bumper and a chassis body of a vehicle. A side weight may be attached to each side line so that each side line aligns with a corresponding predetermined position on a lateral leg cross marker. The perimeter lines also may include a front line, e.g., another string, secured to the front of the vehicle, e.g., on the underside of the vehicle front bumper edge. A front weight may be attached to the front line so that the front line aligns with a center of a front center marker. Similarly, a rear line, e.g., another string, may be secured to an underside of the vehicle back bumper edge. A rear weight may be attached to the rear line so that the rear line aligns with a center of a rear center marker. A plurality of puzzle blocks may be assembled by one or more connection mechanisms. The assembling may include connecting a front center marker to a first end of an adjustable front spacer. A second end of the adjustable front spacer may be connected to a first end of a first end of a front cross marker. A second end of the front cross marker may be connected to a first end of a front lateral cross marker. A second end of the front lateral cross marker may be connected to a first end of an adjustable lateral spacer. A movable side marker may be attached to a top surface of the adjustable lateral spacer. A second end of the adjustable lateral spacer may be connected to a first end of a rear lateral leg cross marker. A second end of the rear lateral leg cross marker may be connected to a first end of a rear cross marker. A second end of the rear cross marker may be connected to a first end of a rear center marker. A front adjustable slider may be connected to the center of the front center marker to align a front of the vehicle with the center of the front center marker. A rear adjustable slider may be connected to the center of the rear center marker to align a rear of the vehicle with the center of the rear center marker. A lateral side adjustable slider may be connected to the corresponding predetermined position on the lateral cross marker to align a side of the vehicle with the predetermined position on the lateral cross marker. The puzzle blocks include one or more sizes and have a quantity based on a calibration parameter of the sensor.

The object and advantages of the embodiments will be realized and achieved at least by the elements, features, and combinations particularly pointed out in the claims.

It is to be understood that both the foregoing summary description and the following detailed description are explanatory as to some embodiments of the present invention, and not restrictive of the present invention as claimed.

BRIEF DESCRIPTION OF THE DRAWINGS

Example embodiments will be described and explained with additional specificity and detail through the use of the accompanying drawings in which.

DETAILED DESCRIPTION OF EXAMPLES OF EMBODIMENTS

In the figures, dimensions and/or proportions may be exaggerated for clarity of illustration. It will also be understood that when an element is referred to as being "connected to" another element, it may be directly connected or indirectly connected, i.e., intervening elements may also be present. Further, it will be understood that when an element is referred to as being "between" two elements, it may be the only element layer between the two elements, or one or more intervening elements may also be present. Like reference numerals refer to like elements throughout.

Embodiments of the present invention will be explained with reference to the accompanying drawings.

There is a need for a tool to simplify an on-vehicle camera system calibration process to increase the efficiency of the camera calibration process and to decrease costs associated thereto. In particular, embodiments of the present invention provide for a tool that a technician may quickly and easily assemble and place around a vehicle without taking any measurements. The technician may follow simple assembly instructions to assemble the tool based on a predetermined configuration for a vehicle type or size.

Figure 1:
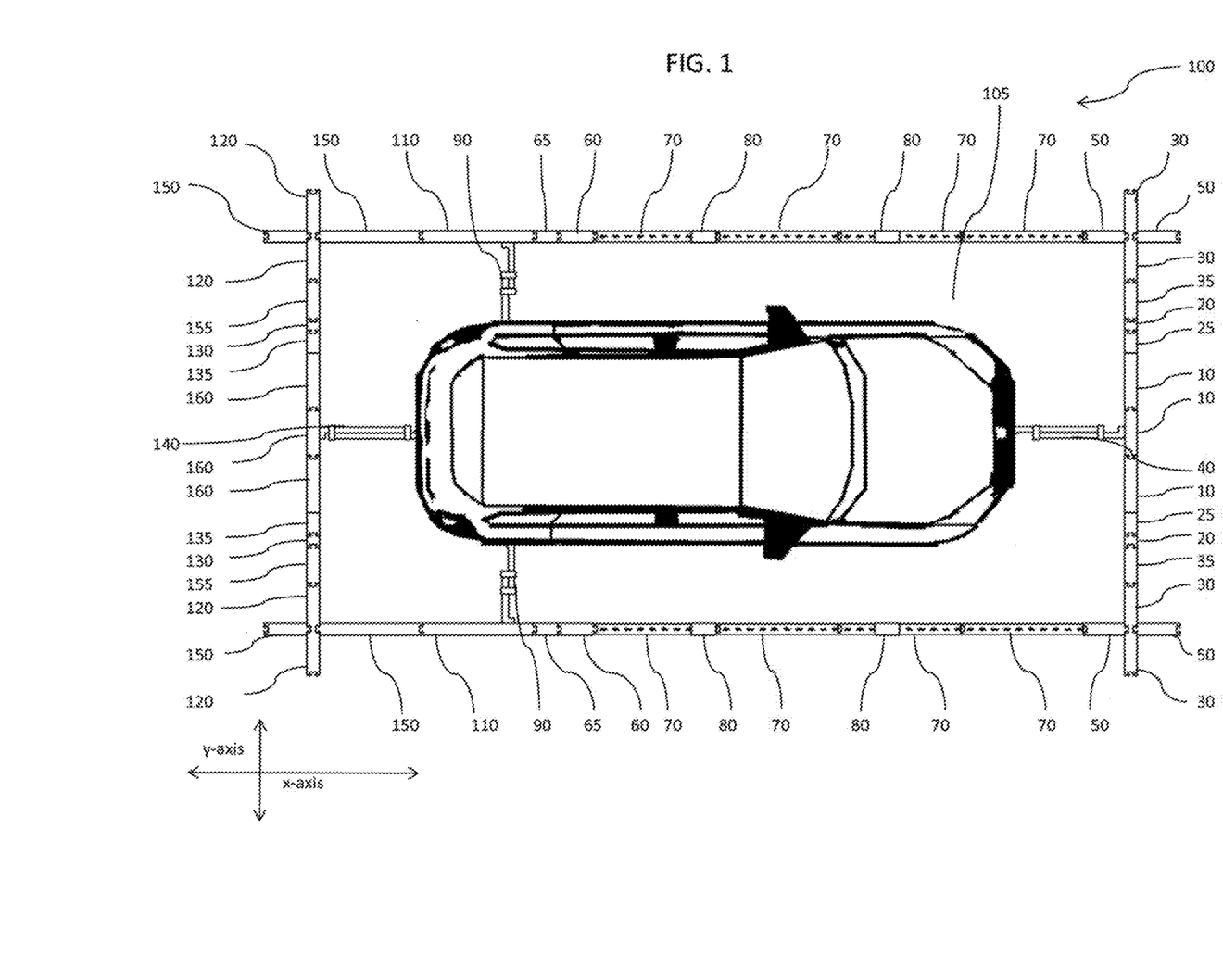
FIG. 1 depicts a system for marker placement according to an example of an embodiment of the present invention.

FIG. 1 depicts a puzzle block system 100 for marker placement. The puzzle block system 100 may include a plurality of puzzle blocks forming a frame around a sensor or sensor system to be calibrated. For example, FIG. 1 illustrates a vehicle 105 having a camera sensor system therein for calibration, and the puzzle block system 100 may be configured relative to the vehicle 105. The puzzle blocks may be fabricated of a suitable material, such as polyvinyl chloride (PVC), expanded PVC plastic, acrylonitrile butadiene styrene (ABS) plastic, or any other environment-resistant or durable material.

The puzzle block system 100 may include a plurality of puzzle blocks termed as follows: a front center marker 10, adjustable front spacer 20, adjustable front spacer 25, front frame piece 35, front cross marker 30, and adjustable front slider 40 along a first axis, (hereby termed the y-axis); and front lateral cross marker 50, adjustable lateral spacer 60, adjustable lateral spacer 65, lateral spacer 70, moveable slide marker 80, lateral adjustable slider 90, rear lateral leg cross marker 110 on both sides of the vehicle along a second axis, (hereby termed the x-axis); and rear cross marker 120, rear lateral cross marker 150, rear adjustable spacer 130, rear adjustable spacer 135, rear frame piece 155, rear center marker 160 and rear adjustable slider 140 also along the y-axis. These block terms are used for ease in describing the various embodiments of the invention, to identify the location or position of each block within the puzzle block system 100 and relative to the vehicle or sensor system to be calibrated. It should be understood that some of these blocks are interchangeable with others in the system 100 for use at different positions or locations. For example, the spacers may be interchangeable with each other; likewise, depending on the specific requirements of the sensor system to be calibrated, the markers used for the sensor calibration may be interchangeable with each other.

The puzzle block system 100 may be oriented in any direction in a two dimensional plane so as to form a frame, having aforementioned x and y axes, around a sensor or sensor system to be calibrated.

Front center marker 10 may be used to align the puzzle block system 100 with a front line that corresponds with a center line of the vehicle 105, with a predetermined distance away from the front of the vehicle using the adjustable front slider 40. Hence, the adjustable front slider 40 may be used to align the puzzle block system 100 with a front line that corresponds with a center line of the vehicle 105 and front center marker 10.

Adjustable front spacer 20 and adjustable front spacer 25 may be used to adjust the size along the y-axis of the puzzle block system 100 so that it may be configured to be used for a plurality of vehicle types (or camera/sensor system to be calibrated). Adjustable front spacer 20 and adjustable front spacer 25 may include multiple sizes connectable together, the multiple sizes including 100 mm, 200 mm and 300 mm spacers, for example. One or more adjustable front spacer 20 and adjustable front spacer 25 may be used in the puzzle block system 100 based on a predetermined configuration for a vehicle type, to extend or contract the puzzle block system along the y-axis. FIG. 1 depicts use of one adjustable front spacer 20 and one adjustable front spacer 25 to show possible use of a combination of front spacers of different sizes; however, it should be understood that none or any number of spacers 20 and/or 25 may be used in the puzzle block system 100 for adjusting the length of the front side of block system 100.

Front cross marker 30 and front lateral cross marker 50 may be used to calibrate one or more cameras and/or sensors. For example, cross markers 30, 50 may be used to calibrate one or more sensors of the sensor system in the vehicle 105, such as 360-degree view cameras, blind spot sensors, park assist cameras, front cameras, and lane detection cameras or sensors for the vehicle 105.

Adjustable lateral spacer 60 and/or adjustable lateral spacer 65 may be used to adjust the size of the puzzle block system 100 so that it may be configured to be used for a plurality of vehicle types. Adjustable lateral spacer 60 and adjustable lateral spacer 65 may include multiple sizes, the multiple sizes including 100 mm, 200 mm and 300 mm spacers, for example. One or more adjustable lateral spacers 60 and adjustable lateral spacer 65 may be used in the puzzle block system 100 based on a predetermined configuration for a vehicle type. FIG. 1 depicts use of one adjustable lateral spacer 60 and one adjustable lateral spacer 65 to show possible use of a combination of lateral spacers of different sizes; however, it should be understood that none or any number of spacers 60 and/or 65 may be used in the puzzle block system 100 for adjusting the length of the lateral side of block system 100.

Lateral spacer 70 having a fixed length may be used for placement of movable slide marker 80, which may be moved along lateral spacer 70 and positioned at a specified location on the lateral spacer 70 based on a predetermined configuration for a vehicle type or size. Alternatively, multiple lateral spacers 70 may be connectable together in lieu of or in addition to the lateral spacers 60 and 65 to adjust the length of the lateral side as desired, and the slide marker 80 may slide along multiple lateral spacers 70.

Lateral adjustable slider 90 may be used to align, on one end, with a side edge of the vehicle 105. For example, the lateral adjustable slider 90 may be aligned with a string with attached weight which is secured to the vehicle's rear cross section of a rear bumper and a chassis body and dropped down to the ground to represent an edge of the vehicle's side. Lateral adjustable slider 90 may be used to align, on the other end, with a specified portion on a lateral leg cross marker 110. The alignment of the lateral adjustable slider 90 with respect to the vehicle side edge and lateral leg cross marker 110 are based on a predetermined configuration for a vehicle type or size.

Rear lateral cross marker 150 and rear cross marker 120 may be used to calibrate one or more sensors in the vehicle sensor system as noted earlier.

An adjustable rear spacer 130 and/or adjustable rear spacer 135 may be used to adjust the size of the puzzle block system 100 so that it may be configured to be used for a plurality of vehicle types. These adjustable rear spacers may include multiple sizes. One or more adjustable rear spacers may be used in the system 100 based on a predetermined configuration for a vehicle type. FIG. 1 depicts use of one rear spacer 130 and one rear spacer 135 to show possible of a combination of rear spacers of different sizes; however, it should be understood that none or any number of rear spacers 130 and/or 135 may be used for adjusting the length of the rear side of block system 100.

A rear adjustable slider 140 may be used to align the puzzle block system 100 with a rear line that corresponds with a center line of the vehicle 105 and rear center marker 160.

Rear center marker 160 may be used to align the puzzle block system 100 with a rear line that corresponds with a center line of vehicle 105, and placed a predetermined distance away from the rear of the vehicle 105 using the rear adjustable slider 140.

A front frame piece 35 and a rear frame piece 155 may be used to provide a minimum distance for the frame to surround a sensor or sensor system to be calibrated, from which other blocks in the puzzle block system 100 may connectable together to form the frame.

Figure 2:
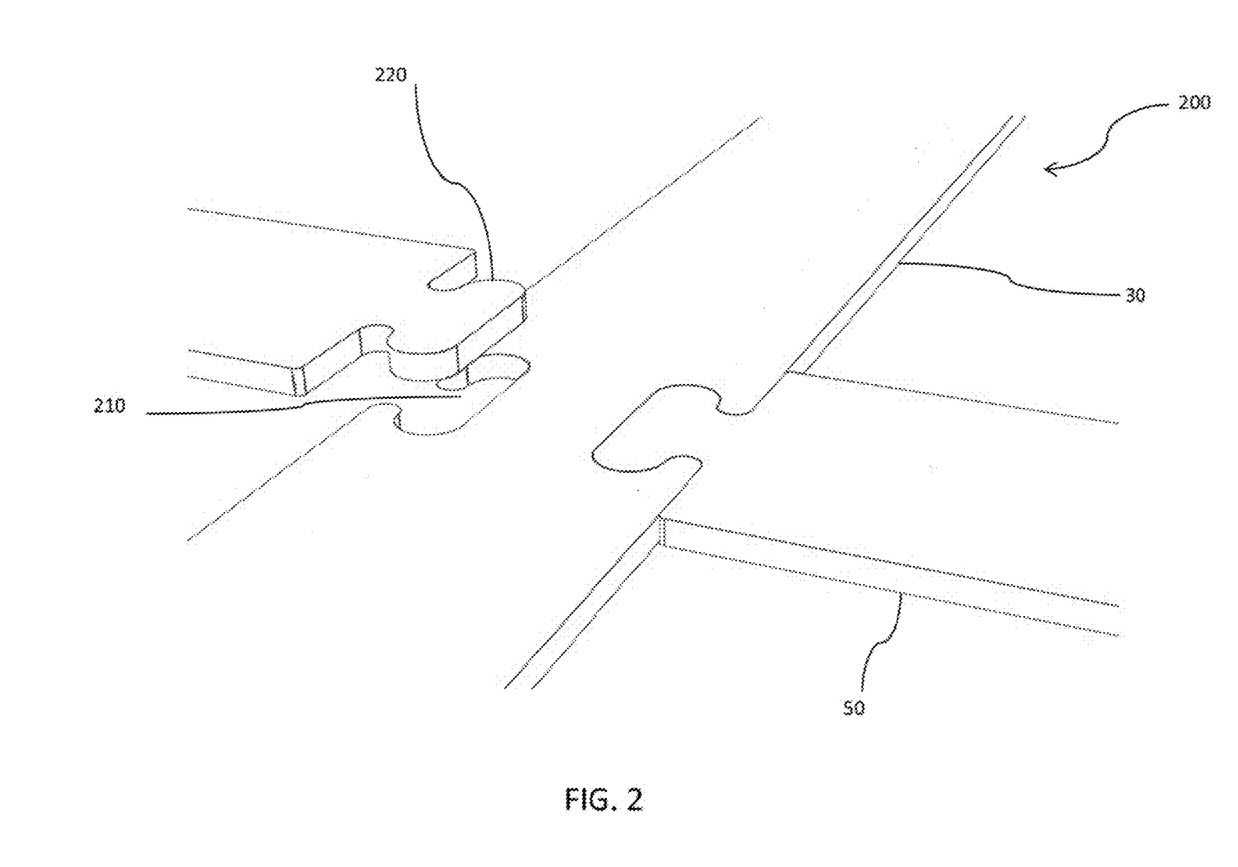
FIG. 2 illustrates a hook type connection mechanism according to an example of an embodiment of the present invention.

FIG. 2 illustrates a hook-type connection mechanism 200, according to one embodiment. The hook-type connection mechanism 200 may be used to connect a plurality of puzzle blocks illustrated in FIG. 1. However, the puzzle blocks may be connectable by any suitable connection mechanism. Hook-type connection mechanism 200 may include a female hook member 210 and a male hook member 220 as illustrated, for example, on front cross marker 30 and front lateral cross marker 50. When male hook member 220 is inserted into female hook member 210 the connection forms a lock between front cross marker 30 and front lateral cross marker 50, for example. Likewise, the hook-type connection mechanism 200 may also be used on rear cross marker 120 and rear lateral cross marker 150, and also with other puzzle blocks in the puzzle block system.

Figure 3:
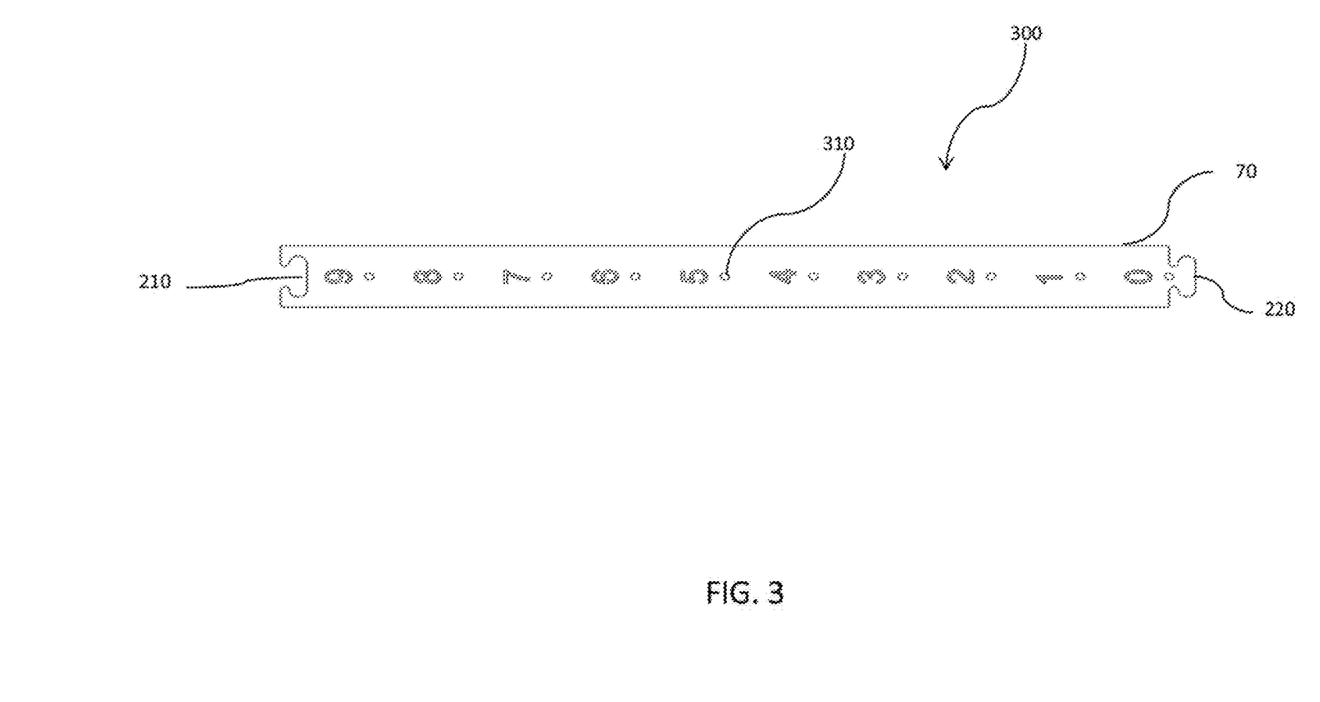
FIG. 3 depicts a view of a lateral spacer according to an example of an embodiment of the present invention.

FIG. 3 depicts a detailed view 300 of a lateral spacer 70. Lateral spacer 70 may include a plurality of equally spaced apart lateral spacer positioning holes 310. Each lateral spacer positioning hole 310 may be labeled with a corresponding number from 0 to 9. One end of lateral spacer 70 may include a female hook member 210 and the other end may include a male hook member 220.

Figure 4A:
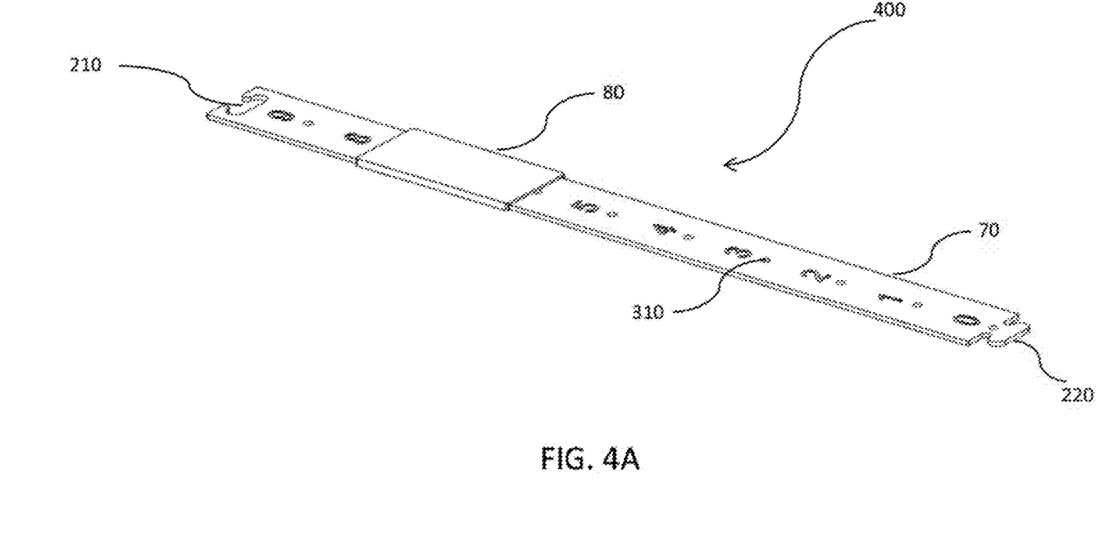
FIG. 4A illustrates another view of the lateral spacer according to an example of an embodiment of the present invention.

FIG. 4A illustrates another view 400 of lateral spacer 70 and moveable slide marker 80, according to one embodiment. Moveable slide marker 80 may be moved along the lateral spacer 70 and positioned at a specified location (e.g., using 0-9 number labeling for location marking) based on a predetermined configuration for a vehicle type and may be used calibrate one or more of 360-degree view cameras, blind spot sensors, park assist cameras, front cameras, and lane detection cameras or sensors for the vehicle 105. In another embodiment, a similar configuration of one or more lateral spacers 70 and moveable slide markers 80 may also be used to position slide markers 80 on a front or rear of the puzzle block system to calibrate any cameras and/or sensors that may be located on a front and rear of a vehicle.

Figure 4B:
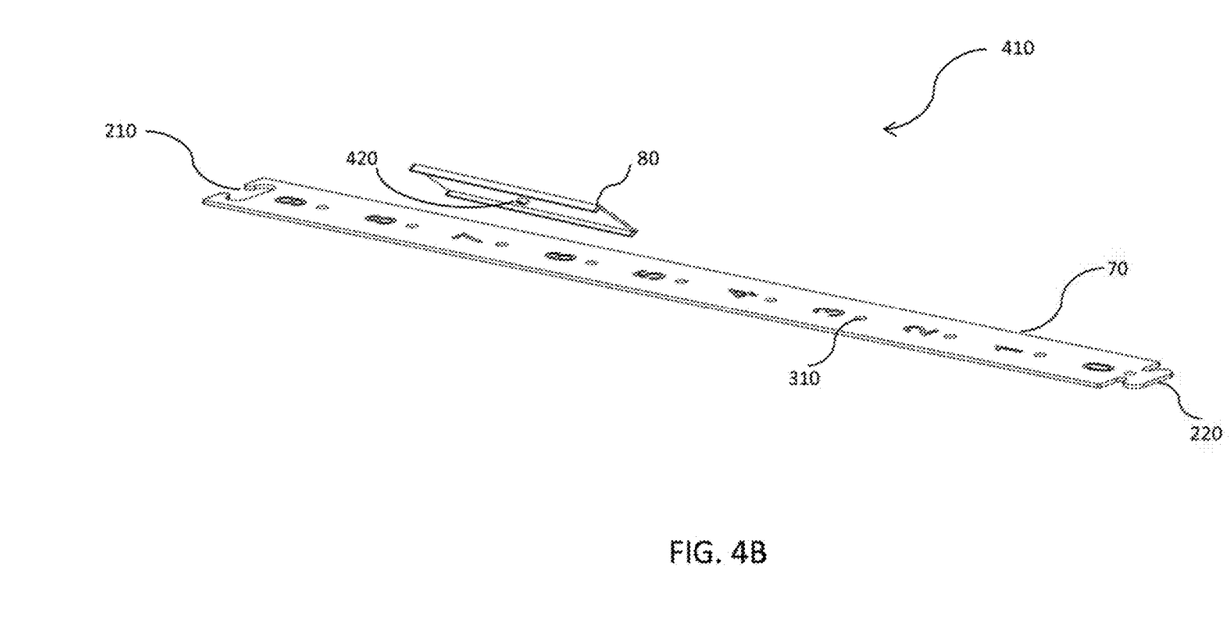
FIG. 4B illustrates another view of the lateral spacer according to an example of an embodiment of the present invention.

FIG. 4B illustrates another view 410 of lateral spacer 70 and moveable slide marker 80. It shows a bottom surface of moveable slide marker 80 that may include a lateral spacer positioning hole male member 420. Lateral spacer positioning hole male member 420 may be inserted into a specified one of lateral spacer positioning holes 310 labeled with a corresponding number for positioning the moveable slide marker 80 at a specified location along the lateral spacer 70 in accordance with a predetermined configuration for a vehicle type or size. Additionally, moveable side marker 80 includes a side edge to secure moveable slide marker 80 to lateral spacer 70 to provide an accurate angle to the lateral aligned puzzle blocks of the puzzle block system. It should be understood that other positioning mechanisms also may be used here to allow the slide marker 80 to move along the length of the lateral spacer 70 and secure it to various designated positions on the lateral spacer 70.

Figure 5A:
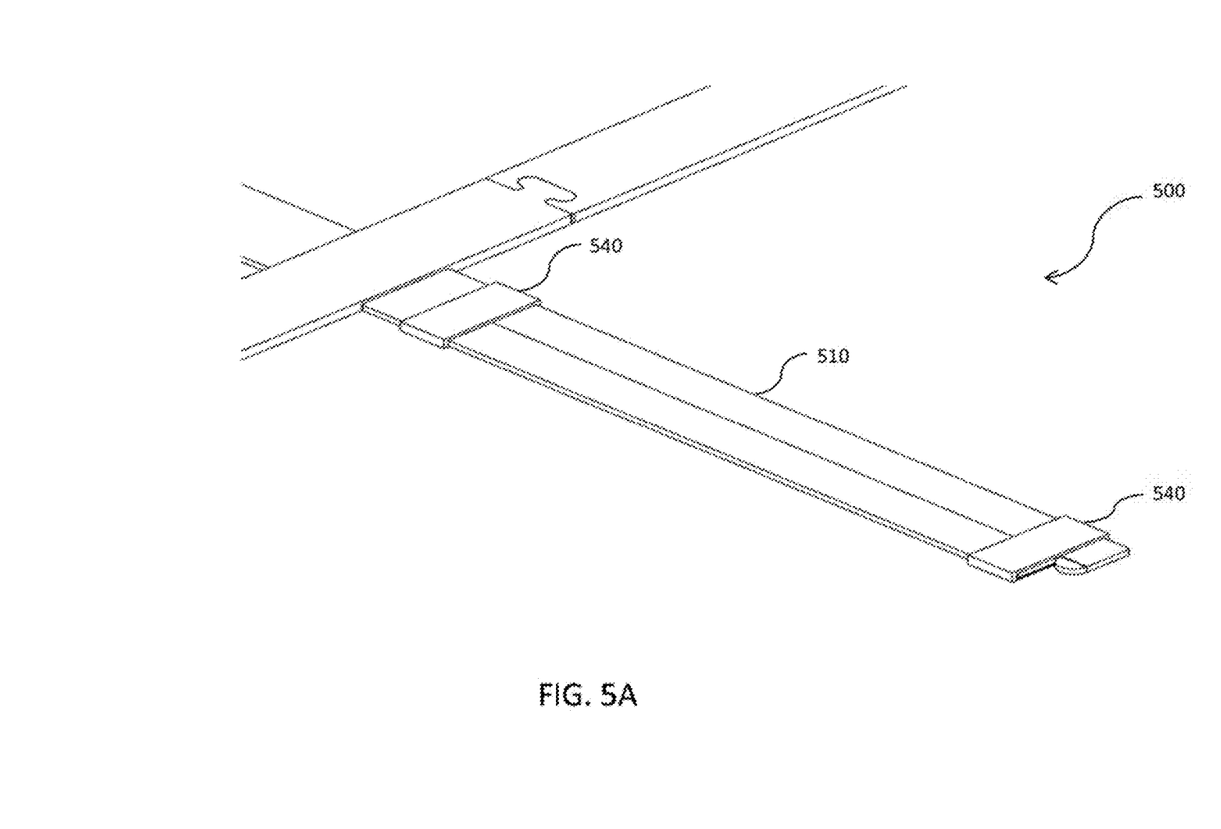
FIG. 5A depicts a view of an adjustable slider according to an example of an embodiment of the present invention.

FIG. 5A depicts a view 500 of an adjustable slider 510. Adjustable slider 510 is an example of front adjustable slider 40, lateral adjustable slider 90 and/or rear adjustable slider 140. Adjustable slider 510 may include slide members 540.

Figure 5B:
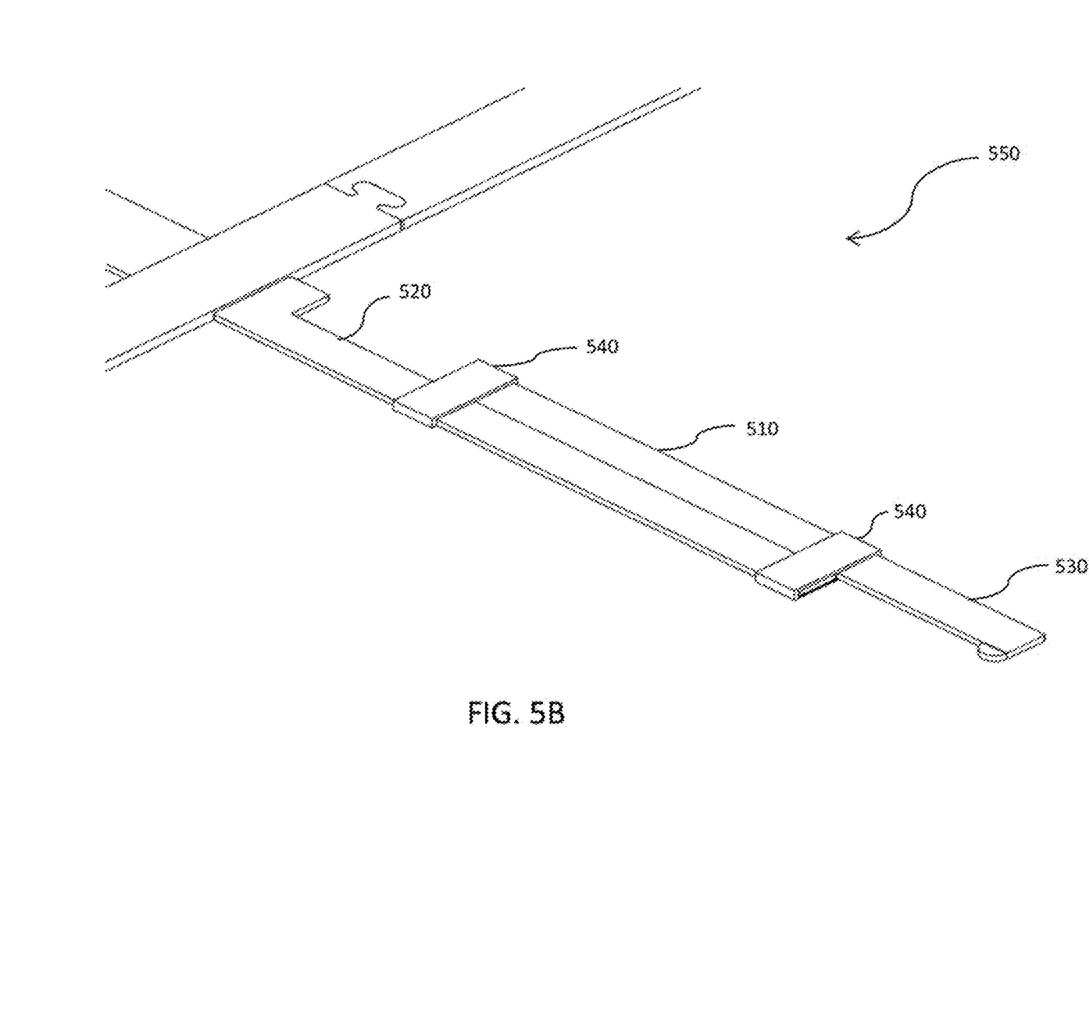
FIG. 5B depicts a view of an adjustable slider according to an example of an embodiment of the present invention.

FIG. 5B illustrates another view 550 of the adjustable slider 510. Adjustable slider 510 may include a front piece 520, a rear piece 530 and slide members 540. Front piece 520 may be used to align the puzzle block system 100 with a front line that corresponds with a center line of a vehicle and front center marker 10, for example. Front piece 520 and rear piece 530 may be adjusted by sliding front piece 520 and rear piece 530 towards each other or opposite of each other via slide members 540. Slide members 540 may be clips, for example, to hold the front piece 520 and the rear piece 530 of adjustable slider 510 adjacent to each other.

Figure 6:
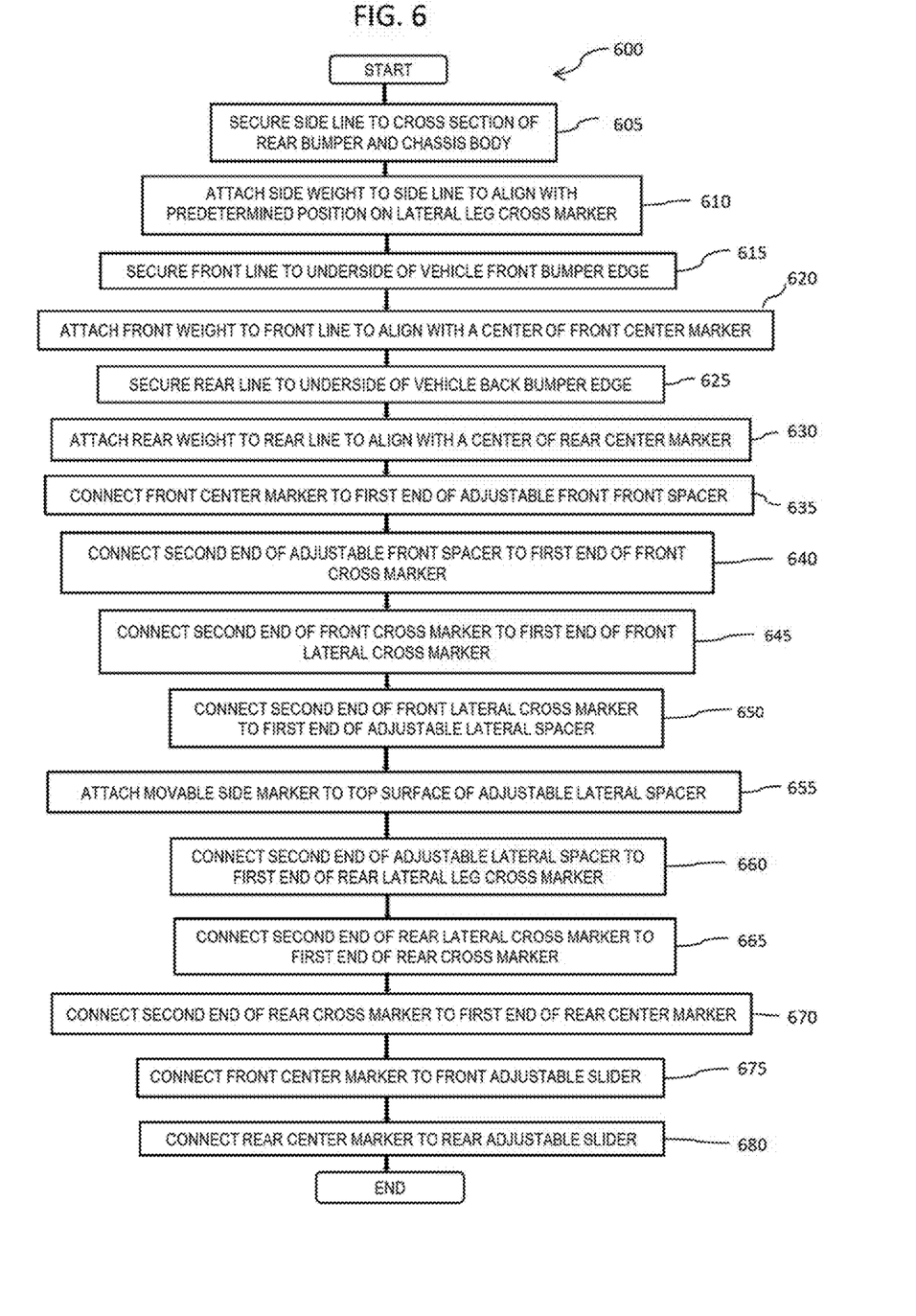
FIG. 6 illustrates a flow diagram for a method for marker placement according to an example of an embodiment of the present invention.

FIG. 6 illustrates a flow diagram for a method for marker placement 600. The method for marker placement may include securing a side line to each of a left rear and a right rear cross section of a rear bumper and a chassis of a body of a vehicle 605.

In 610, a side weight may be attached to each side line so that each side line aligns with a corresponding predetermined position on a lateral leg cross marker.

In 615, a front line may be secured to a vehicle front edge as noted earlier.

In 620, a front weight may be attached to the front line so that the front line aligns with a center of a front center marker.

In 625, a rear line may be secured to a vehicle rear edge as noted earlier.

A rear weight may be attached to the rear line so that the rear line aligns with a center of a rear center marker in 630.

A plurality of puzzle blocks may be assembled by connection members.

The assembling may include connecting a front center marker to a first end of an adjustable front spacer 635.

A second end of the adjustable front spacer may be connected to a first end of a front cross marker in 640.

In 645, a second end of the front cross marker may be connected to a first end of a front lateral cross marker.

In 650, a second end of the front lateral cross marker may be connected to a first end of an adjustable lateral spacer.

In 655, a movable side marker may be attached to a top surface of the adjustable lateral spacer.

A second end of the adjustable lateral spacer may be connected to a first end of a rear lateral leg cross marker in 660.

A second end of the rear lateral leg cross marker may be connected to a first end of a rear cross marker in 665.

In 670, a second end of the rear cross marker may be connected to a first end of a rear center marker.

In 675, a front adjustable slider may be connected to the center of the front center marker to align a front of the vehicle with the center of the front center marker.

A rear adjustable slider may be connected to the center of the rear center marker to align a rear of the vehicle with the center of the rear center marker in 680.

In 680, a lateral side adjustable slider may be connected to the corresponding predetermined position on the lateral cross marker to align a side of the vehicle with the predetermined position on the lateral cross marker.

Figure 9:
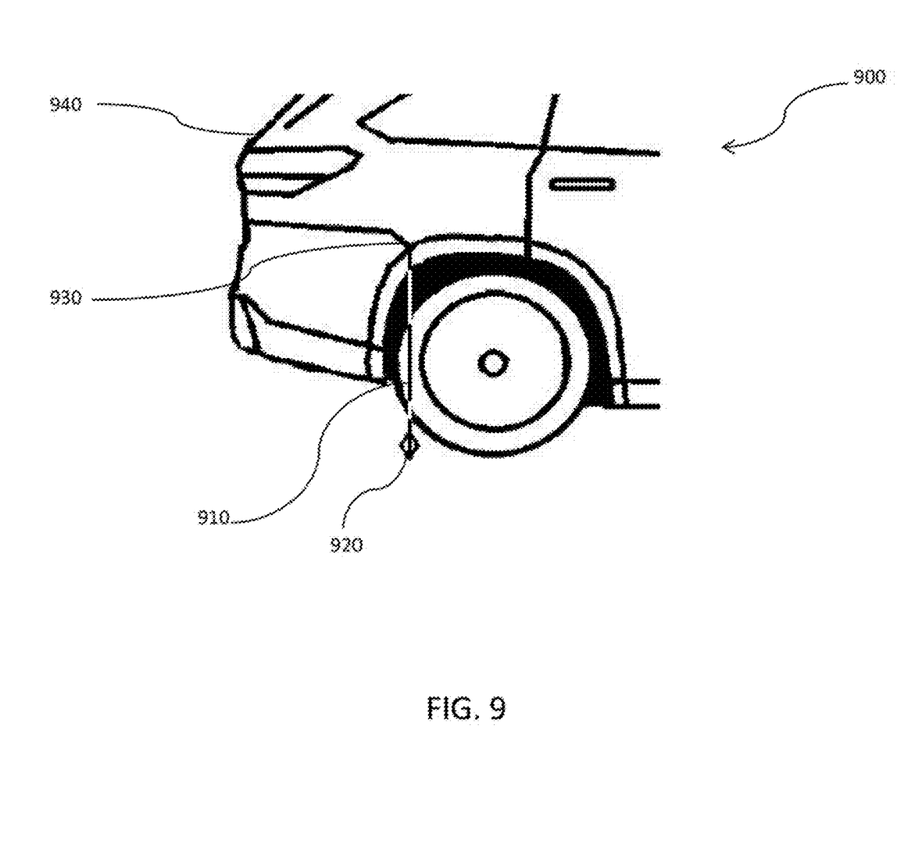
FIG. 9 illustrates an example of a side line with attached weight secured to a rear cross section of a rear bumper and a chassis of a vehicle.

FIG. 9 illustrates an example 900 of a side line with an attached weight secured to a rear cross section of a rear bumper and a chassis of a vehicle. Side line 910 may be secured to a rear cross section of a rear bumper 930 of vehicle 940. However, side line 910 may be secured to another portion of the rear bumper and rear cross section of vehicle 940. Side weight 920 may be attached to side line 910 to align side line 910 with a corresponding predetermined position on lateral leg cross marker 100 illustrated in FIG. 1.

Figure 7:
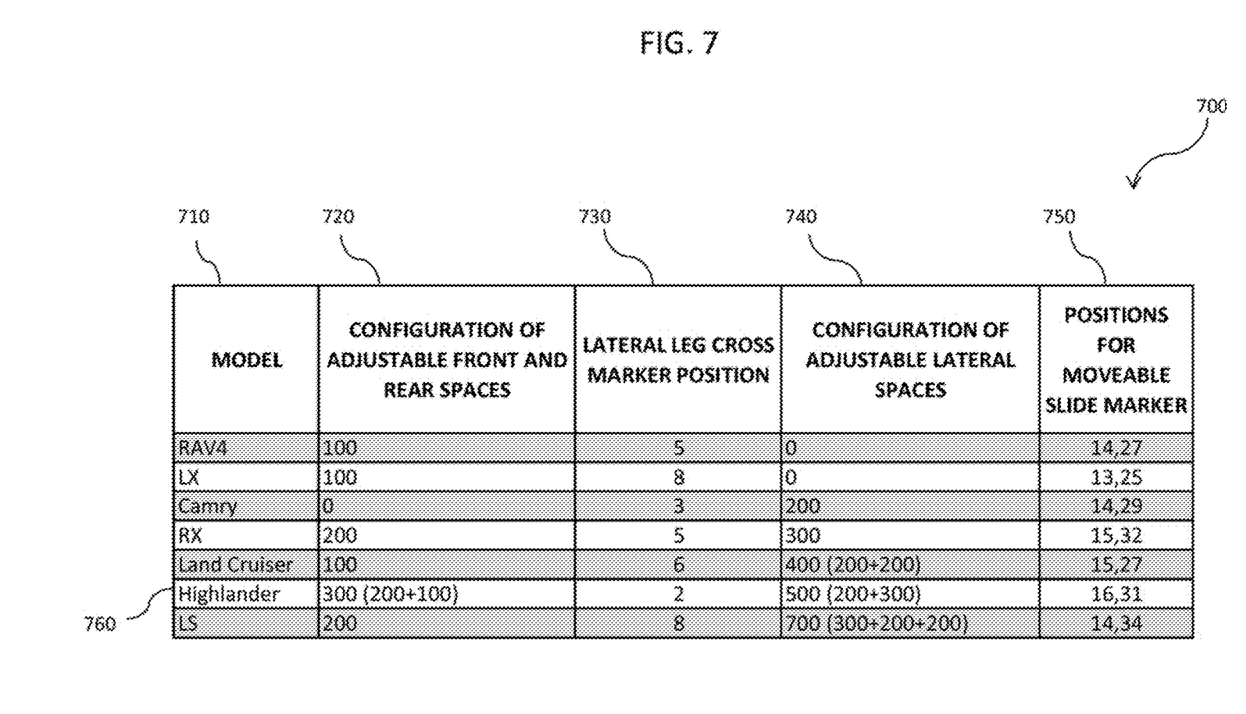
FIG. 7 illustrates a table listing a predetermined configuration for a plurality of vehicle types for the system for marker placement according to an example of an embodiment of the present invention.

FIG. 7 illustrates an example of a table listing a predetermined configuration for a plurality of vehicle types 700 for the puzzle block system 100, according to one embodiment. The table listing a predetermined configuration for a plurality of vehicle types 700 may list a plurality of vehicle models in column 710. The system for marker placement is not limited to those vehicles listed in column 710, but may be configured for any brand and type of vehicle.

A configuration of adjustable front spacers 20, 25 and adjustable rear spacers 130, 135 are listed for each vehicle type in column 720.

A specified position on a lateral leg cross marker 110 is listed in column 730 for a plurality of vehicle models listed in column 710. The specified position on a lateral leg cross marker 110 may be aligned with a side line secured to a rear cross section of a rear bumper and a chassis body of a vehicle for a plurality of vehicle models listed in column 710.

A configuration of adjustable lateral spacers 60, 65 are listed in column 740 for each vehicle model.

A specified position for each moveable slide marker 80 on lateral spacers 70 is listed in column 750 for a plurality of vehicle models listed in column 710.

In row 760, a predetermined configuration for a Toyota Highlander® for the puzzle block system 100 is provided as an example. A configuration of adjustable front spacers 20, 25 and adjustable rear spacers 130, 135 for a Toyota Highlander® is listed in column 720. For example, a combination of a 100 mm adjustable spacer and a 200 mm adjustable spacer is specified for adjustable front spacers 20 and 25, respectively and adjustable rear spacers 130, 135, respectively. A specified position on a lateral leg cross marker 110 is listed in column 730 for a Toyota Highlander®. For example, the specified position on a lateral leg cross marker 110 is position 2 and may be aligned with a side line secured to a vehicle rear cross section of a rear bumper and a chassis body of a Toyota Highlander®. A configuration of adjustable lateral spacers 60, 65 is listed in column 740 for a Toyota Highlander®. For example, a combination of a 300 mm adjustable spacer and a 200 mm adjustable spacer is specified for adjustable lateral spacer 60 and 65, respectively. A specified position for each moveable slide marker 80 on lateral spacers 70 is listed in column 750 for a Toyota Highlander®. For example, as illustrated in FIG. 3, each lateral spacer 70 may include a plurality of equally spaced apart lateral spacer positioning holes 310. Each lateral spacer positioning hole 310 may be labeled with a corresponding number from 0 to 9. Four lateral spacers 70 are specified in the configuration for a Toyota Highlander®. Thus, a combination of 4 lateral spacers 70 provides 40 lateral spacer positioning holes 310 corresponding to positions from 0 to 39. The specified positions for each moveable slide markers 80 are listed as 16 and 31 in the configuration for a Toyota Highlander®.

Figure 8:
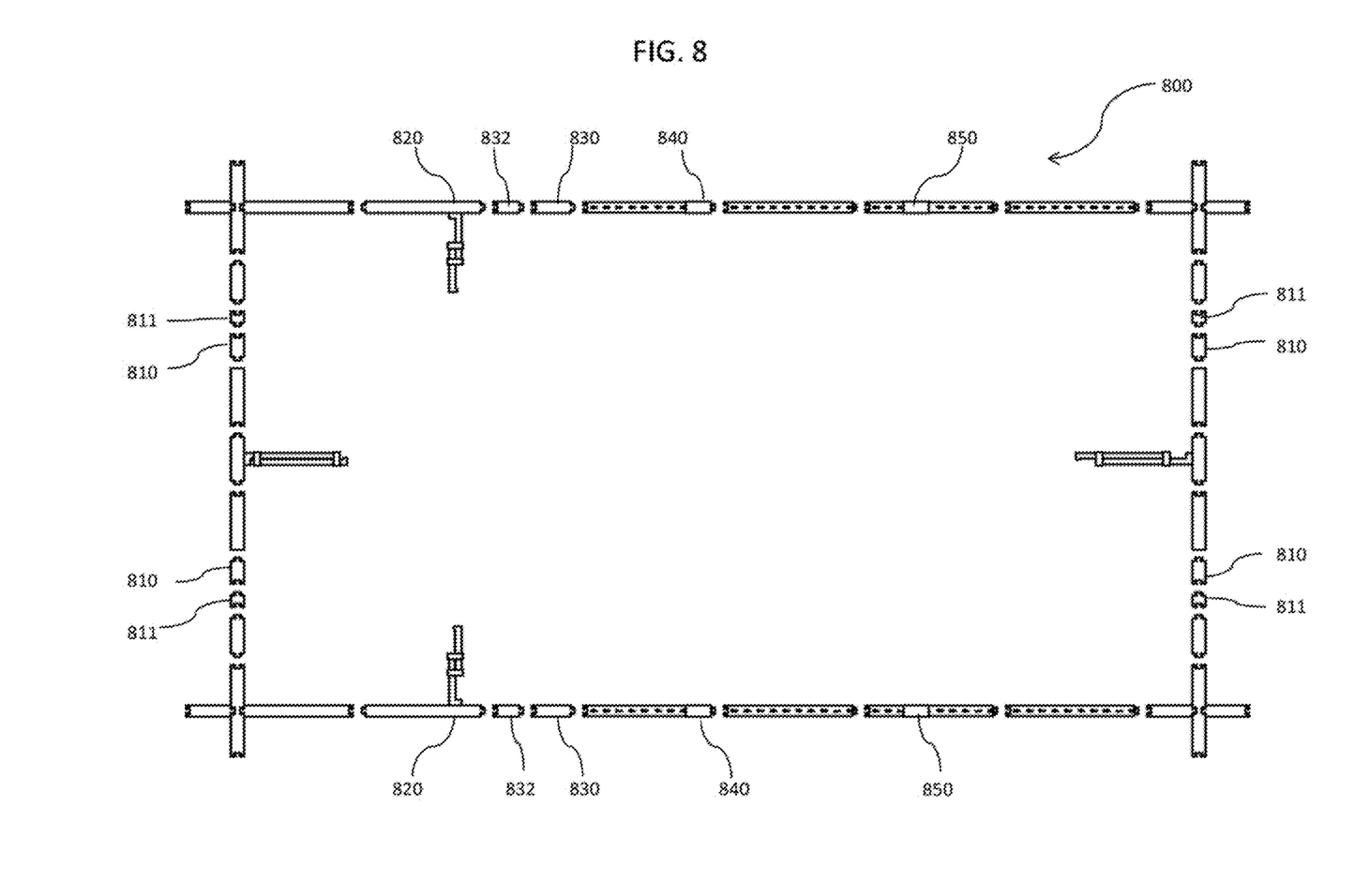
FIG. 8 illustrates a predetermined configuration of a Toyota Highlander® for the puzzle block system 100 in accordance with the table listing a predetermined configuration 700 shown in FIG. 7 according to an example of an embodiment of the present invention.

FIG. 8 illustrates a predetermined configuration 800 of a Toyota Highlander® for the puzzle block system 100 in accordance with the table listing a predetermined configuration 700 shown in FIG. 7. For example, a combination of a 200 mm adjustable spacer 810 with a 100 mm adjustable spacer 811 may be used for each of adjustable front spacers 20, 25 and adjustable rear spacers 130, 135. For example, 820 designates the specified position on a lateral leg cross marker 110 as position 2 and may be aligned with a side line secured to a rear wheel cover. A combination of a 300 mm adjustable spacer 830 and a 200 mm adjustable spacer 832 is specified for adjustable lateral spacer 60 and 65, respectively. The specified positions for each moveable slide markers 80 is 16 and 31 as designated by 840 and 850, respectively.

Examples of embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made therein without departing from the spirit and scope of the present invention as set forth in the claims.

The invention claimed is:

1. A system for marker placement, comprising:
a plurality of puzzle blocks connectable by a connection mechanism; and
the plurality of puzzle blocks including a plurality of markers positioned in a predetermined configuration, wherein
the puzzle blocks are connected together by the connection, mechanism to surround a sensor with the plurality of markers;
the puzzle blocks include one or more sizes and have a quantity based on a calibration parameter of the sensor; and
the puzzle blocks include a front center marker, a front adjustable slider an adjustable front spacer, a front cross marker, a front lateral cross marker, a lateral spacer, an adjustable lateral spacer, a movable side marker, a lateral adjustable slider, a rear lateral leg cross marker, a rear lateral cross marker, a rear cross marker, an adjustable rear spacer, a rear center marker, and a rear adjustable slider.

2. The system for marker placement of claim 1, wherein the connection mechanism includes male and female hook type members connectable to lock the plurality of puzzle blocks together.

3. The system for marker placement of claim 1, wherein the sensor for calibration is on a vehicle.

4. The system for marker placement of claim 1, wherein the puzzle blocks include a predetermined configuration for sensor calibration for each of a plurality of vehicles.

5. The system, for marker placement of claim 1, wherein the lateral spacers include numbered positioning holes.

6. The system for marker placement of claim 5, wherein the movable side marker includes a male member on a bottom surface connectable to the lateral spacer numbered positioning holes.

7. The system for marker placement of claim 5, wherein the front cross marker, the lateral cross marker and the rear cross marker are placed to calibrate at least one of a 360-degree view camera, a blind spot sensor, a park assist camera, a front camera and a lane detection camera.

8. The system for marker placement of claim 7, wherein the rear cross marker is used to position a blind spot tool to calibrate a blind spot sensor.

9. The system for marker placement of claim 7, wherein the rear center marker is used to position a park assist tool to calibrate the park assist camera.

10. The system for marker placement of claim 7, wherein the front center marker is used to position a front camera tool to calibrate the front camera.

11. The system for marker placement of claim 7, wherein the front center marker is used to position a lane detection tool to calibrate the lane detection camera.

12. A method for marker placement, comprising:
securing a side line to each of a left rear cross section of a rear bumper and a chassis body and a right rear cross section of a rear bumper and a chassis body of a vehicle,
attaching a side weight to each side line so that each side line aligns with a corresponding predetermined position on a lateral, leg cross marker,
securing a front line to an underside of a front bumper edge of the vehicle,
attaching a front weight to the front line so that the front line aligns with a center of a front center marker,
securing a rear line to an underside of a rear bumper edge of the vehicle,
attaching, a rear weight to the rear line so that the rear line aligns with a center of a rear center marker, and
assembling a plurality of puzzle blocks by a connection mechanism, the assembling including,
connecting a front center marker to a first end of an adjustable front spacer,
connecting a second end of the adjustable front spacer to a first end of a front cross marker,
connecting a second end of the front cross marker to a first end of a front lateral cross marker,
connecting a second end of the front lateral cross marker to a first end of an adjustable lateral spacer,
attaching a movable side marker to a top surface of the adjustable lateral spacer,
connecting a second end of the adjustable lateral spacer to a first end of a rear lateral leg cross marker,
connecting a second end of the rear lateral leg cross marker to a first end of a rear cross marker,
connecting a second end of the rear cross marker to a first end of a rear center marker,
connecting a front adjustable slider to the center of the front center marker to align a front of the vehicle with the center of the front center marker,
connecting a rear adjustable slider to the center of the rear center marker to align a rear of the vehicle with the center of the rear center marker, and
connecting a lateral side adjustable slider to the corresponding predetermined position on the lateral cross marker to align a side of the vehicle with the predetermined position on the lateral cross marker.

13. The method for marker placement of claim 12, wherein
the connection mechanism includes male and female hook type members connectable to lock the plurality of puzzle blocks together.

14. The method for marker placement of claim 12, wherein
the lateral spacers include numbered positioning holes.

15. The method for marker placement of claim 14, wherein
the movable side marker includes a male member on a bottom surface connectable to the lateral spacer numbered positioning holes.

16. The method for marker placement of claim 12, wherein
the puzzle blocks are connected to surround the vehicle.

17. The method for marker placement of claim 12, wherein
the puzzle blocks include a predetermined configuration for each of a plurality of vehicles.

18. The method for marker placement of claim 12, wherein
the front cross marker, the lateral cross marker and the rear cross marker is placed to calibrate at least one of a 360-degree view camera, a blind spot sensor, a park assist camera, a front camera and a lane detection camera.

19. The method for marker placement of claim 18, wherein
the rear cross marker is used to position a blind spot tool to calibrate a blind spot sensor.

20. The method for marker placement of claim 18, wherein
the rear center marker is used to position a park assist tool to calibrate the park assist camera.

21. The method for marker placement of claim 18, wherein
the front center marker is used to position a front camera tool to calibrate the front camera.

22. The method for marker placement of claim 18, wherein
the front center marker is used to position a lane detection tool to calibrate the lane detection camera.

* * * * *